United States Patent
Smith et al.

(10) Patent No.: US 8,145,659 B1
(45) Date of Patent: Mar. 27, 2012

(54) REAL-TIME COMMUNICATIONS ENHANCED SEARCH

(75) Inventors: Jeffrey A. Smith, Seattle, WA (US); Rohit Deep, Union City, CA (US)

(73) Assignee: Cisco Technology, Inc., San Jose, CA (US)

(*) Notice: Subject to any disclaimer, the term of this patent is extended or adjusted under 35 U.S.C. 154(b) by 748 days.

(21) Appl. No.: 10/938,234

(22) Filed: Sep. 9, 2004

(51) Int. Cl.
*G06F 7/00* (2006.01)

(52) U.S. Cl. ........ 707/765; 707/722; 707/728; 707/759; 707/767

(58) Field of Classification Search .............. 707/2, 722, 707/728, 759, 765, 767; 709/206
See application file for complete search history.

(56) References Cited

U.S. PATENT DOCUMENTS

| | | | | |
|---|---|---|---|---|
| 5,790,637 | A * | 8/1998 | Johnson et al. | 379/88.04 |
| 5,873,080 | A * | 2/1999 | Coden et al. | 707/3 |
| 6,249,281 | B1 * | 6/2001 | Chen et al. | 715/753 |
| 6,260,041 | B1 * | 7/2001 | Gonzalez et al. | 707/10 |
| 6,311,194 | B1 * | 10/2001 | Sheth et al. | 715/236 |
| 6,351,467 | B1 * | 2/2002 | Dillon | 370/432 |
| 6,457,009 | B1 * | 9/2002 | Bollay | 707/10 |
| 6,513,036 | B2 * | 1/2003 | Fruensgaard et al. | 707/4 |
| 6,529,899 | B1 | 3/2003 | Kraft et al. | |
| 7,039,635 | B1 * | 5/2006 | Morgan et al. | 707/4 |
| 7,451,136 | B2 * | 11/2008 | Chua et al. | 707/4 |
| 2001/0044751 | A1 * | 11/2001 | Pugliese et al. | 705/26 |
| 2001/0051982 | A1 * | 12/2001 | Graziani | 709/204 |
| 2002/0077930 | A1 * | 6/2002 | Trubey et al. | 705/26 |
| 2002/0078033 | A1 * | 6/2002 | Scaturro et al. | 707/3 |
| 2002/0120697 | A1 * | 8/2002 | Generous et al. | 709/206 |
| 2003/0005445 | A1 * | 1/2003 | Schein et al. | 725/51 |
| 2003/0105831 | A1 * | 6/2003 | O'Kane | 709/217 |
| 2003/0223562 | A1 * | 12/2003 | Cui et al. | 379/202.01 |
| 2004/0093327 | A1 * | 5/2004 | Anderson et al. | 707/3 |
| 2004/0119814 | A1 * | 6/2004 | Clisham et al. | 348/14.08 |
| 2004/0194141 | A1 * | 9/2004 | Sanders | 725/53 |
| 2005/0060377 | A1 * | 3/2005 | Lo et al. | 709/206 |
| 2005/0234883 | A1 * | 10/2005 | Szeto et al. | 707/3 |
| 2006/0277108 | A1 * | 12/2006 | Altberg et al. | 705/14 |
| 2007/0083408 | A1 * | 4/2007 | Altberg et al. | 705/7 |
| 2007/0162458 | A1 * | 7/2007 | Fasciano | 707/10 |

OTHER PUBLICATIONS

Findwhat.Com Launches Pioneering Advertising Service—Pay-Per-Call. FlndWhat.com—Performance Driven Marketing, Sep. 14, 2004. Webpage [online] [retrieved on Sep. 17, 2004] Retrieved from the internet: file://C Documents%20and%20Settings Administrator Local%20Settings_Temporary%20. . . .

* cited by examiner

*Primary Examiner* — Cheyne Ly

(57) ABSTRACT

One embodiment disclosed relates to a method of providing a real-time communications enhanced search service. When a search request from a client application, a search is obtained based on the search request. In addition, information as to relevant real-time communications channels, if any, is determined based on the search request. The results of the search and the information as to the relevant real-time communications channels may be combined and returned to the client application. Upon receiving a request from the client application to initiate opening of a relevant real-time communications channel, the relevant real-time communications channel may be established by communications with a second client application of a third party. Other embodiments are also disclosed.

26 Claims, 3 Drawing Sheets

REAL-TIME COMMUNICATIONS ENHANCED SEARCH

BACKGROUND OF THE INVENTION

1. Field of the Invention

The present invention relates generally to computer networking, software and communications. More particularly, the present invention is related in the general area of Internet search technology.

2. Description of the Background Art

Conventional Internet search engines permit users to search for a wide variety of information on the world wide web. There are also domain-specific search engines that provide users a more focused search within the desired domain.

Typically, a successful search produces a search results page with result items, each usually containing a universal resource locator or URL, an abstract, and some additional information about the resource found. A user may use a pointing device (for example, a mouse) to select a result item, which, through a hyperlink, will retrieve and open the selected document. Improvements and enhancements to Internet search technology are highly desirable.

SUMMARY

One embodiment of the invention relates to a method of providing a real-time communications enhanced search service. When a search is requested from a client application, search results are obtained based on the search request. In addition, information as to relevant real-time communications channels, if any, is determined based on the search request. A real-time communications channel is a means by which two or more persons can instantly communicate with each other, and may include one or more of the following: the live transmission of video, audio, data, text or images or the live reproduction of computer screen displays which enable persons to create, view, modify and annotate documents, applications, web pages, presentations or other data. The results of the search and the information as to the relevant real-time communications channels may be combined and returned to the client application. Upon receiving a request from the client application to initiate opening of a relevant real-time communications channel, the relevant real-time communications channel may be established by communications with a second client application.

Another embodiment of the invention pertains to an apparatus configured to provide a real-time communications enhanced search service. The apparatus includes a communications interface that receives a search request from a client application. The apparatus further includes a means for obtaining a search based on the search request and a means for determining information as to relevant real-time communications channels based on the search request. The apparatus may be configured to combine results of the search and the information as to the relevant real-time communications channels and to return the combined results to the client application. The apparatus may also be configured such that, upon receiving a request from the client application to initiate opening of a relevant real-time communications channel, the relevant real-time communications channel is established by communications with a second client application.

Another embodiment of the invention pertains to a system configured to provide a real-time communications enhanced search service to a client application sending a search request. The system includes at least a search engine, a real-time communications relationship manager, and an enhanced search application server. The search engine is configured to provide search results based on keywords in the search request. The real-time communications relationship manager is configured to provide information as to relevant real-time communications channels based at least in part on the keywords in the search request. The enhanced search application server configured to combine the search results and the information as to the relevant real-time communications channels and to return the combined results to the client application.

DETAILED DESCRIPTION

Figure 1:
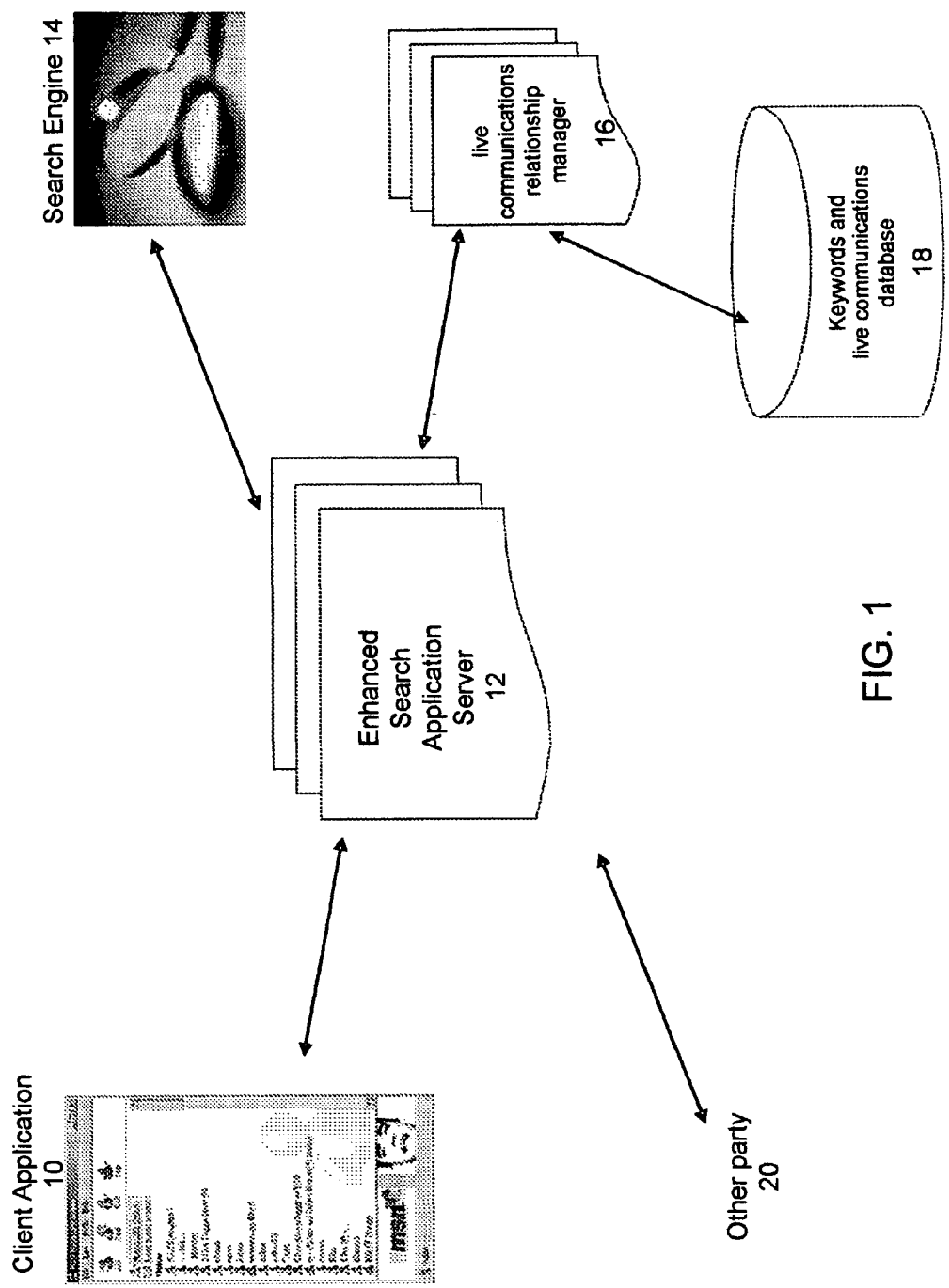
FIG. 1 is a schematic diagram of a system for enhancing search results by providing keyword-induced real-time communications channels in accordance with an embodiment of the invention.

FIG. 1 is a schematic diagram of a system for enhancing search results by providing keyword-induced real-time communications channels in accordance with an embodiment of the invention. As depicted, the system includes various components, including a client application 10, an enhanced search application server 12, a search engine 14, a live communications relationship manager 16, a keyword and real-time communications database 18, and another party 20 using a same or similar client application (with whom the real-time communications may take place).

The client application 10 may comprise, for example, a web browser or similar application, either at a desktop, laptop, wireless, or other device. The search engine 14 may comprise Internet search technology available, for example, from Google Inc. of Mountain View, Calif., or Yahoo! Inc. of Sunnyvale, Calif., or other sources.

The enhanced search application server 12 functions to coordinate the operation of the system. The enhanced search application server 12 may be accessible over the Internet by way of a search or portal web site. such as. for example. those at the google.com or yahoo.com domains. The search engine 14 and live communications relationship manager 16 may each comprise computer systems coupled to the enhanced search application server 12.

Figure 2:
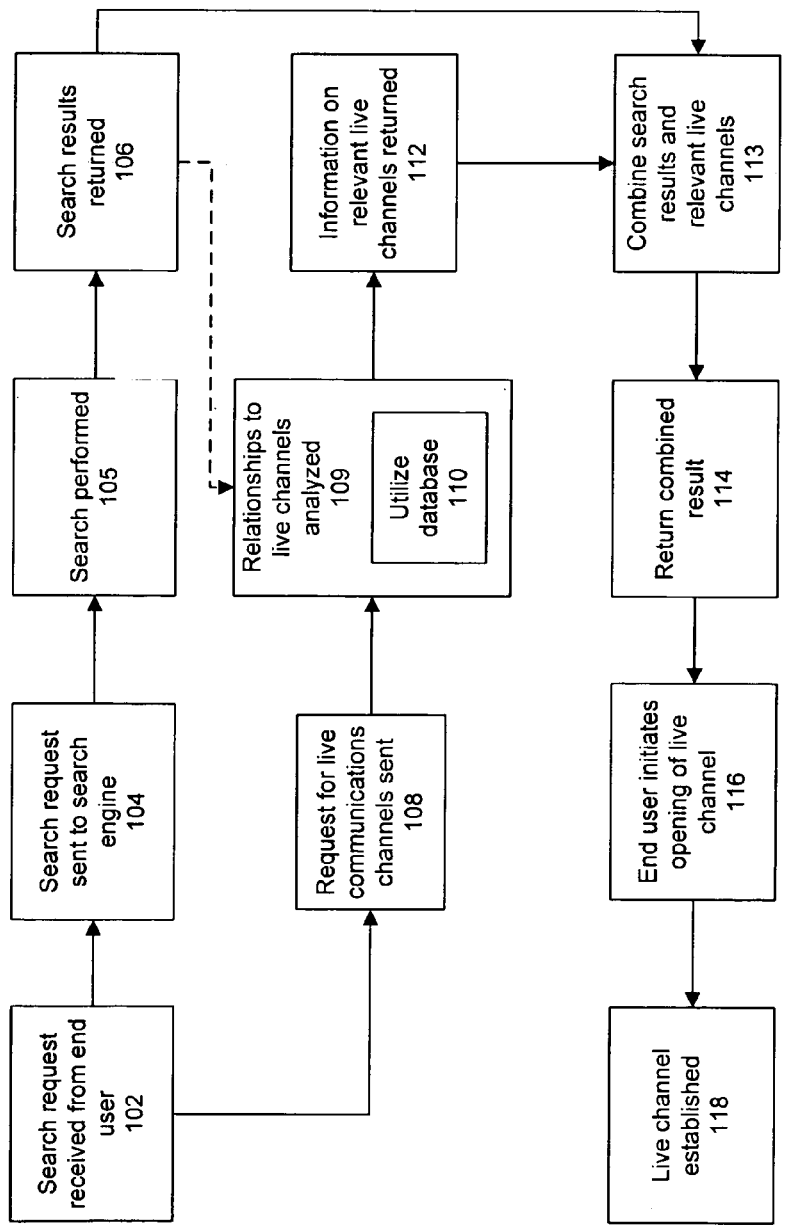
FIG. 2 is a flow chart depicting a method for enhancing search results by providing keyword-induced real-time communications channels in accordance with an embodiment of the invention.
Figure 3:
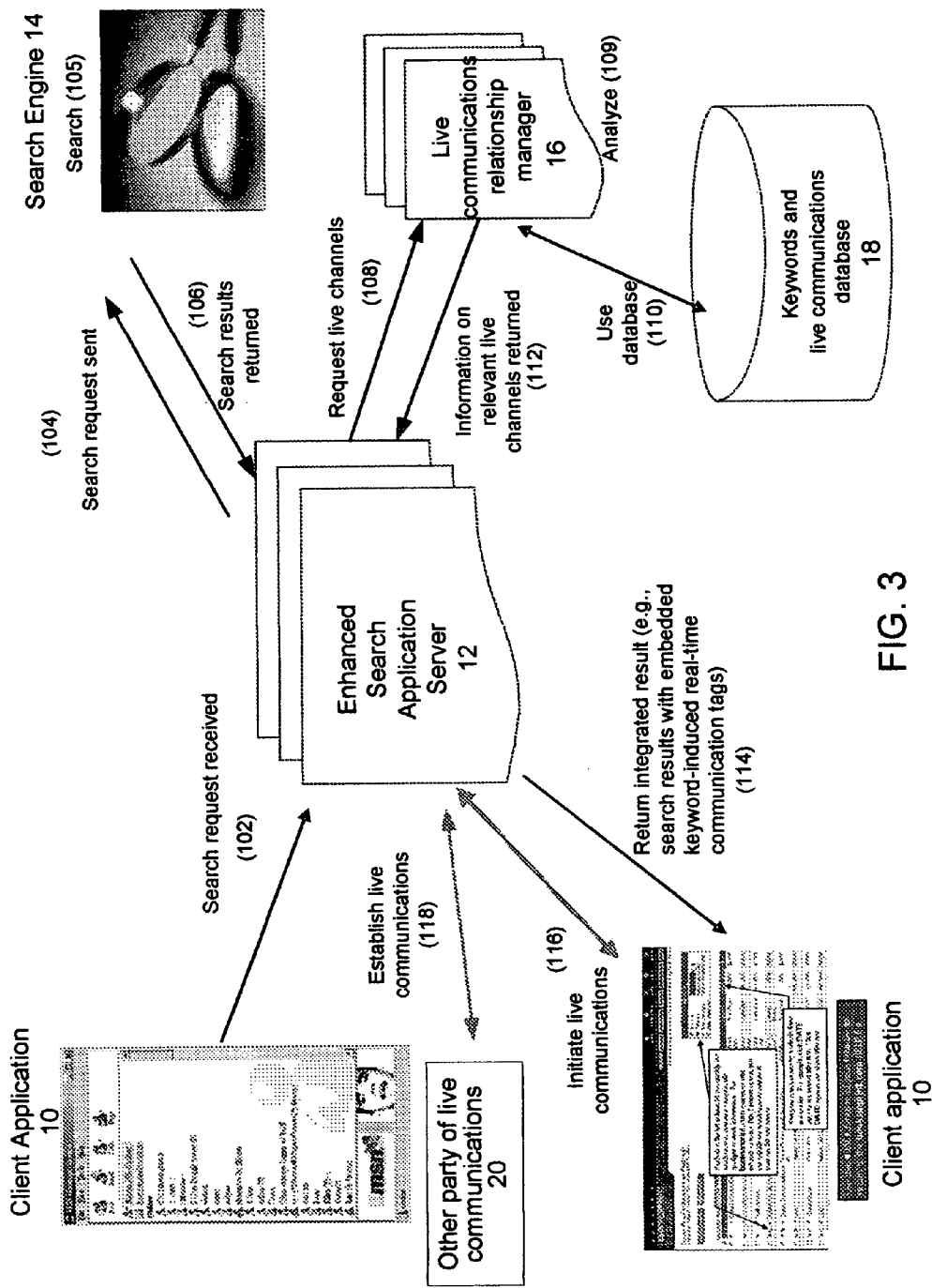
FIG. 3 is a schematic diagram of showing the method of FIG. 2 applied within the system of FIG. 1 in accordance with an embodiment of the invention.

FIG. 2 is a flow chart depicting a method for enhancing search results by providing keyword-induced real-time communications channels in accordance with an embodiment of the invention. As shown in FIG. 3, the method of FIG. 2 may be performed, for example, within the system of FIG. 1.

The method may begin when a search request is received (102). The search request may comprise, for example, a search request based on keywords entered by an end user. As depicted in FIG. 3, the search request may be received (102) by the enhanced search application server 12 from the client application 10.

The search request is then sent out (104), so that a search is performed 105 based on the search request, and the search result returned (106). As depicted in FIG. 3, the search request may be sent (104) to a search engine 14 for performance (105)

of the search. The search results may then be returned (106) from the search engine 14 to the enhanced search application server 12.

In addition to sending (104) the search request to a search engine 14, a request for real-time communications channels is also sent (108), so that relationships to real-time communications channels may be analyzed (109), and one or more relevant real-time communications channels, if any, may be returned (112). In a preferred embodiment, the request for real-time communications may be based on the keywords entered by an end user during the formation of the search request. As depicted in FIG. 3, the request for real-time communications channels may be sent (108) to a live communications relationship manager 16 for performance of the analysis (109).

The analysis (109) may utilize (110) a database 18 of real-time communications channels and associated keywords. In accordance with one embodiment, the analysis (109) involves using the search keywords entered by the end user to search the database 18 for the relevant real-time communications channels.

In accordance with another embodiment, the analysis (109) involves expanding the keywords entered by an end user into a larger set of related words. This larger set of words is then used to search the database 18 for the relevant real-time communications channels.

In accordance with another embodiment, the search results from the search engine 14 may be received by the live communications relationship manager 16 and used as a basis for (or to expand) the analysis (109). In one implementation, the search results may be streamed from the search engine 14 to the live communications relationship manager 16 so as to enhance the speed of the analysis procedure (109).

In accordance with another embodiment, an intelligent filter may be applied so as to filter out less relevant or irrelevant real-time communications channels. For example, if the user was searching using both the keywords "football" and "World Cup", the intelligent filter may filter out real-time communications channels related to American football while retaining real-time communications channels related to soccer.

A preferred embodiment for the analysis (109) may combine more than one of the above-described features (keyword expansion, use of search results, and intelligent filtering).

A relevant real-time communications channel may comprise, for example, a video conference channel to a live salesperson or customer relations operator. For instance, if the search keywords included "Ford" and "Mustang", then the relevant real-time communications channel may comprise a video and/or audio conference channel (and/or text messaging channel, and/or application sharing, and/or another type of communications channel) to an appropriate customer relations operator of the Ford Motor Company, or to a salesperson at a local dealer of Ford automobiles, or to a customer relations operator or salesperson of a competing automobile manufacturer (General Motors, Toyota, BMW, etc.), or to an auto parts or accessories shop, or to any other party.

Information as to the relevant real-time communications channels, if any, may then be returned (112) to the enhanced search application server 12. The information returned (112) may comprise an interactive tag to be embedded in the search results. Alternatively, the information may be returned (112) in various other different forms.

The search results and information as to relevant real-time communications channel(s) may then be combined (113), and the combined result returned (114). In a preferred embodiment, the combined result may comprise a hyper text markup language (html) page of the search results that is enhanced by one or more embedded tags, if any, that link to the related real-time communications channels. In another embodiment, the combined result may provide both search results and relevant real-time communications channels, but not necessarily integrated into a same document or file. For example, the relevant real-time communications channels may be presented to an end user of the client application 10 in a separate area from the search results. In one implementation, the areas may be separated using html frames. In another implementation, a floating window or toolbar may be used to display the relevant real-time communications channels. Advantageously, such a floating window or toolbar or similar implementation may be configured to be advantageously persistent. For example, in one implementation, the information as to the relevant real-time communications channels may remain persistent at the client application until a next search request from the client application.

As depicted in FIG. 3, the combination (113) may be performed by the enhanced search application server 104, and the combined result returned from that server 104 to the client application 10 from which the search request originated. (Note that two example screens are illustrated for the client application 10 in FIG. 3, one screen at the origination of the search request and another screen at the return of the combined result.)

An end user at the client application 10 may then, if desired, initiate (116) opening of one or more of the real-time communications channels. The real-time communications channel may then be established (118) to the other party 20 of the real-time communications. In a preferred embodiment, the opening of a real-time communications channel may be initiated (116) by the end user "clicking on" or otherwise selecting an embedded tag associated with the channel. A request to open the associated real-time channel may then be received by the enhanced search application server 12, which may then establish (118) the real-time channel with the other party. After the real-time communications channel is established (118), real-time communications between the end user at the client application 10 and the other party 20 may occur by way of the channel.

In a preferred embodiment, the real-time communications channel may be provided by way of a network configured for real-time communications, such as the network provided by WebEx Communications, Inc. of San Jose, Calif., or another similar network. In other embodiments, the real-time communications channel may be provided over the Internet, a telecommunications network, or other network. In one embodiment, the real-time communications channel may be implemented using a central server. In another embodiment, the real-time communications channel may be implemented using a peer-to-peer connection or network.

In one embodiment, the real-time communications channel may configured to include text messaging. In another embodiment, the real-time communications channel may be configured to include audio communications. In another embodiment, the real-time communications channel may be configured to include both video and audio communications. In another embodiment, the real-time communications channel may be configured to include application sharing. The application sharing may be provided, for example, using technology from WebEx Communications, Inc. of San Jose, Calif. Such application sharing may be used advantageously, for example, by a salesperson to make a live demonstration of a software-related product.

In one embodiment, a provider of the real-time communications enhanced search may charge client companies for including their real-time communications links in the enhanced search results. The charging may comprise a "click-thru" charge, for example, $0.20 for each time an end-user actually opens one of the real-time communications channels to that company. Alternatively, the charging may comprise a "per minute" or "per time" charge, for example, $0.03 per minute that one of the real-time communications channels from an end user to that company is in use. As another alternative, a combination of the "click-thru" and "per minute" charging may be used.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of providing a real-time communications enhanced search service, the method comprising:
   receiving over a network, at a search application server, a search request from a client application, wherein the search request includes one or more keywords;
   sending, by the search application server, the search request to an Internet search engine to search the Internet using the one or more keywords;
   obtaining first search results based on the search of the Internet;
   sending, by the search application server, the search request to a real-time communications relationship manager for a live communications database;
   causing at least some of the first search results based on the search of the Internet to be sent to the real-time communications relationship manager for the live communications database, the at least some of the first search results to be used to expand the one or more keywords to produce an expanded set of keywords;
   obtaining second search results based on a search of the live communications database for real-time communications channels using the expanded set of keywords; and
   returning the first search results and the second search results to the client application.

2. The method of claim 1, wherein the returning further comprises:
   combining the first search results and the second search results; and
   returning the combined results to the client application.

3. The method of claim 2, wherein the client application comprises a web browser, and the combined results comprise an HTML page with embedded tags linking to the real-time communications channels, if any.

4. The method of claim 1, wherein the second search results are displayed in a separate area from the first search results, by the client application.

5. The method of claim 1, further comprising:
   receiving a request from the client application to initiate opening of a real-time communications channel.

6. The method of claim 4, further comprising:
   establishing the real-time communications channel by communications with a second client application.

7. The method of claim 5, wherein the real-time communications channel is established by using a central server.

8. The method of claim 5, wherein the live communications channel is established by using a peer-to-peer connection.

9. The method of claim 1, wherein the determination of the real-time communications channels utilizes an intelligent filter to filter out less relevant real-time communications channels.

10. The method of claim 1, wherein the second search results remain persistent at the client application until a next search request from the client application.

11. The method of claim 6, further comprising charging a customer a "click-thru" charge each time a real-time communications channel of the customer is established.

12. The method of claim 6, further comprising charging a customer a "per time" charge based on a time that an established channel is kept open.

13. The method of claim 6, further comprising:
   charging a customer both a "click-thru" charge each time a real-time communications channel of the customer is established and a "per time" charge based on a time that an established channel is kept open.

14. A system configured to provide a real-time communications enhanced search service to a client application, the system comprising:
   a search engine configured to receive a search request that includes one or more keywords and to search the Internet and provide first search results based on the one or more keywords in the search request;
   a live communications relationship manager configured to search a live communications database and to provide second search results as to real-time communications channels, based on an expanded set of keywords that are derived from the one or more keywords in the search request and from at least some of the first search results from the search engine configured to search the Internet; and
   an enhanced search application server configured to combine the first and second search results and to return the combined results to the client application.

15. The system of claim 14, wherein the client application comprises a web browser, and wherein the first search results and the second search results are combined and the combined results comprise an HTML page with embedded tags linking to the real-time communications channels, if any.

16. The system of claim 14, wherein the enhanced search application server is further configured to establish a live communications channel with a second client application of a third party upon receiving a request to initiate opening of said channel from the client application.

17. The method of claim 1, wherein a real-time communications channel is a real-time video or audio communications channel between the user and a live salesperson.

18. The method of claim 1 wherein the real-time communications channels comprise one or more video conferencing channels, audio conferencing channels, text messaging channels, or application sharing channels, in which two or more persons communicate with each other.

19. A method comprising:
receiving, at a search application server, a search request from a client application that includes one or more keywords;
providing, by the search application server, the search request to an Internet search engine to search the Internet using the one of more keywords and to produce first search results;
providing, by the search application server, the search request to a search engine for real-time communications channels;
causing at least some of the first search results based on the search of the Internet to be sent to the search engine for real-time communications channels, the at least some of the first search results to be used to expand the keywords to produce an expanded set of keywords;
obtaining second search results from the search engine for real-time communications channels based on a search of real-time communications channels using is the expanded set of keywords; and
returning the second search results to the client application, wherein the second search results include indications of one or more real-time communications channels.

20. The method of claim 19, wherein the returning further comprises:
combining the first search results and the second search results; and
returning the combined results to the client application.

21. The method of claim 19, wherein the client application is a web browser, and wherein the second search results are represented as an HyperText Markup Language (HTML) page linking to the one or more real-time communications channels.

22. The method of claim 19, further comprising:
receiving a request from the client application to establish one of the one or more real-time communications channels.

23. The method of claim 22, further comprising:
establishing the real-time communications channel by communications with a second client application.

24. The method of claim 19 wherein the real-time communications channels comprise one or more video conferencing channels, audio conferencing channels, text messaging channels, or application sharing channels, in which two or more persons communicate with each other.

25. A system comprising:
a search engine configured to receive a search request that includes one or more keywords from a client application, and to search the Internet and provide first search results based on the one or more keywords in the search request;
a search engine for real-time communications channels configured to search real-time communications channels and to provide second search results that indicate real-time communications channels, based on an expanded set of keywords derived from the one or more keywords in the search request and from at least some of the first search results from the search engine configured to search the Internet; and
an enhanced search application server configured to obtain second search results from the search engine for real-time communications channels and return the second search results to the client application, wherein the second search results include indications of one or more real-time communications channels.

26. The system of claim 25 wherein the enhanced search application server is configured to return the second search results by combination of the first search results and the second search results and return of the combined results to the client application.

\* \* \* \* \*